(12) United States Patent
Williams et al.

(10) Patent No.: US 9,852,087 B2
(45) Date of Patent: Dec. 26, 2017

(54) INLINE PCI-IOV ADAPTER

(75) Inventors: James B. Williams, Costa Mesa, CA (US); Shawn Adam Clayton, Costa Mesa, CA (US); Maria Clara Gutierrez, Costa Mesa, CA (US); Alexander Nicolson, IV, Costa Mesa, CA (US); James Winston Smart, Costa Mesa, CA (US); John Leland Wood, Costa Mesa, CA (US); David James Duckman, Costa Mesa, CA (US); Carl John Lindeborg, Costa Mesa, CA (US); William Irving Leavitt, Costa Mesa, CA (US)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 1074 days.

(21) Appl. No.: 12/764,002

(22) Filed: Apr. 20, 2010

(65) Prior Publication Data

US 2011/0258352 A1 Oct. 20, 2011

(51) Int. Cl.
*G06F 13/00* (2006.01)
*G06F 13/16* (2006.01)
*G06F 13/38* (2006.01)
*G06F 13/40* (2006.01)
*G06F 13/42* (2006.01)

(52) U.S. Cl.
CPC ............ *G06F 13/16* (2013.01); *G06F 13/385* (2013.01); *G06F 13/4068* (2013.01); *G06F 13/4282* (2013.01); *Y02B 60/1228* (2013.01); *Y02B 60/1235* (2013.01)

(58) Field of Classification Search
CPC .... G06F 13/385; G06F 13/4072; G06F 13/38; G06F 13/4286; G06F 13/4022; G06F 3/0635; Y02B 60/1228; H04L 12/00; H04L 12/56
USPC ................ 710/316–317, 305–306, 100, 110; 370/254
See application file for complete search history.

(56) References Cited

U.S. PATENT DOCUMENTS

| | | | | |
|---|---|---|---|---|
| 6,823,418 | B2 * | 11/2004 | Langendorf et al. | 710/306 |
| 7,356,636 | B2 * | 4/2008 | Torudbakken et al. | 710/313 |
| 7,979,592 | B1 * | 7/2011 | Pettey et al. | 710/3 |
| 7,991,839 | B2 * | 8/2011 | Freimuth et al. | 709/205 |
| 8,239,655 | B2 * | 8/2012 | Goggin et al. | 711/203 |
| 8,341,327 | B2 * | 12/2012 | Baba et al. | 710/316 |
| 2009/0089464 | A1 * | 4/2009 | Lach et al. | 710/62 |
| 2009/0248947 | A1 * | 10/2009 | Malwankar et al. | 710/316 |
| 2009/0265501 | A1 * | 10/2009 | Uehara et al. | 710/312 |
| 2009/0276551 | A1 * | 11/2009 | Brown et al. | 710/72 |
| 2010/0082874 | A1 * | 4/2010 | Baba et al. | 710/316 |

(Continued)

*Primary Examiner* — Faisal M Zaman
*Assistant Examiner* — Kim T. Huynh
(74) *Attorney, Agent, or Firm* — Sheridan Ross P.C.

(57) ABSTRACT

A system for enabling input/out virtualization for a device is disclosed. In one embodiment, the system includes a plurality of host CPUs; a multi-root switch connected to each of the plurality of host CPUs via respective buses; and an inline PCI virtualizing device connected to the multi-root switch via a front-side bus and the device via a back-side bus, the inline PCI virtualizing device including a plurality sets of registers, each of the plurality sets of registers accessible by a corresponding host CPU of the plurality of host CPUs and implementing functionalities of the device.

34 Claims, 4 Drawing Sheets

(56) References Cited

U.S. PATENT DOCUMENTS

2010/0165874 A1* 7/2010 Brown et al. .................. 370/254
2011/0119423 A1* 5/2011 Kishore et al. ............... 710/302
2011/0179214 A1* 7/2011 Goggin et al. .................... 711/6

* cited by examiner

INLINE PCI-IOV ADAPTER

FIELD OF THE INVENTION

This invention relates generally to network communication and more specifically to a network adapter for Peripheral Component Interconnect (PCI) input/output virtualization (IOV).

BACKGROUND OF THE INVENTION

Virtualization is a widely used technique in network communication and has become a part of an overall trend in enterprise information technology. In general, virtualization provides a layer of abstraction between computer hardware systems and the software running on them. This allows hardware resources, such as processors, memory, I/O, and storage devices, to be divided into multiple sets that operate independently with its own system image instance and applications (e.g., a software component such as an operating system).

As well known in the art, PCI is a long existing standard for attaching peripheral devices to a computer. Typically, one computer can have multiple peripheral devices attached to it. The Peripheral Component Interconnect Special Interest Group (PCI-SIG), a standard body responsible for specifying the PCI, PCI-X, and PCI Express® (PCIe) computer buses, has adapted a new PCI-IOV (input/output virtualization) standard to facilitate I/O virtualization over PCI. The main goal of input/output virtualization is to allow multiple computers to be able to share a single I/O device, thereby saving cost and improving efficiency. Two specifications, one for single root IOV and another for multi-root IOV are provided by PCI-SIG. The single root IOV specification provides native I/O virtualization in existing PCIe topologies where there is a single root complex. The multi-root IOV specification builds on the single root IOV specification to provide native I/O virtualization in new topologies (such as blade servers) where multiple root complexes share a PCIe hierarchy. A copy of the IOV specifications is available on PCI-SIG's website. These PCI-SIG I/O Virtualization (IOV) specifications, in conjunction with system virtualization technologies, allow multiple operating systems running simultaneously within a single computer to natively share PCIe devices.

However, many existing network devices are not compliant with the new PCI-IOV standard. Currently, there is no available PCI-IOV adapters designed for enabling virtualization on an existing non-virtualized device.

SUMMARY OF THE INVENTION

In general, the present invention creates a device conforming to the PCI-IOV standard for I/O virtualization by combining a PCI device which is not IOV compliant (hereinafter referred to as "non-IOV PCI device") with an inline virtualizing device that implements the PCI-IOV standard. In particular, various aspects of the present invention provide, for example: 1) using an inline PCI application-specific integrated circuit (ASIC) to retrofit virtualization on an existing non-IOV PCI device, 2) using address mapping to allow a non-IOV PCI device to master direct memory access (DMA) transactions that are mapped to specific virtualized functions on an PCI-IOV compliant device, 3) using notification queues to allow an inline PCI virtualization device to communicate register value changes to a non-IOV PCI device, and 4) implementing all PCI configuration space, including the newly defined multi-root IOV and single root IOV capabilities for the virtualized device. Each aspect of the invention is discussed in detail below.

In one aspect of the invention, embodiments of the invention are directed to a device conforming to the PCI-IOV standard for facilitating I/O virtualization by combining an existing non-IOV PCI device with an ASIC which implements the PCI-IOV standard. In one embodiment, the inline PCI-IOV device can have two PCIe connections: one that connects to an IOV-aware host device or an IOV-aware PCIe switch (hereinafter referred to as "the front-side connection"), and one that connects to the non-IOV compliant device (hereinafter referred to as "back-side connection"). With those connections, the inline PCI-IOV device can enable I/O virtualization for the back-side non-IOV PCI device.

In one embodiment, the inline PCI-IOV device is capable of implementing host accessible registers for the virtualized functions and notifying the non-IOV PCI device on the back side of such host register access. Because the inline PCI-IOV device can potentially support many virtualized functions corresponding to a single physical link and each virtualized function needs to have its own register set, the number of registers, including both implementation specific registers and PCI defined configuration registers, can become very large. Conventionally, the registers are implemented in hardware, for example, as ASIC gates. However, if all registers have to be implemented in hardware, a large number of gates may be needed to support all the virtualized functions in a virtualized system. To avoid this potential increase in hardware cost, another aspect of the invention introduces a soft register implementation that uses RAM (e.g., embedded or external) to store register data.

The soft register implementation is an alternative implementation of the more traditional ways of implementing registers, which is using direct flip-flops or memory directly written inside a chip. In the soft register implementation, all register and memory access by PCI and by the functional unit to any registers or memory visible to PCI can be handled by a Soft Register Unit. The Soft Register Unit can be used to implement the storage of registers in embedded RAM rather than in ASIC gates. That is, the storage for the register data is all contained in embedded RAM. The Soft Register Unit can be a part of the inline PCI-IOV device to provide a single chip solution for facilitating I/O virtualization. However, it should be understood that embodiments of the Soft Register Unit disclosed in this invention are not only limited to be used in conjunction with an inline PCI-IOV device, but can also be incorporated into other products that facilitate virtualization in hardware in a single device (e.g., a single-chip IOV device).

DETAILED DESCRIPTION OF THE PREFERRED EMBODIMENTS

In the following description of preferred embodiments, reference is made to the accompanying drawings which form a part hereof, and in which it is shown by way of illustration specific embodiments in which the invention can be practiced. It is to be understood that other embodiments can be used and structural changes can be made without departing from the scope of the embodiments of this invention.

In general, the present invention creates a device conforming to the PCI-IOV standard for I/O virtualization by combining a non-IOV PCI device with an inline virtualizing device that implements the PCI-IOV standard. In particular, various aspects of the present invention provide, for example: 1) using an inline PCI ASIC to retrofit virtualization on an existing non-IOV PCI device, 2) using address mapping to allow a non-IOV PCI device to master DMA transactions that are mapped to specific virtualized functions on an PCI-IOV compliant device, 3) using notification queues to allow an inline PCI virtualization device to communicate register value changes to a non-IOV PCI device, and 4) implementing all PCI configuration space, including the newly defined multi-root IOV and single root IOV capabilities for the virtualized device. Each aspect of the invention is discussed in detail below.

In one aspect of the invention, embodiments of the invention are directed to a device conforming to the PCI-IOV standard for facilitating I/O virtualization by combining an existing non-IOV PCI device with an ASIC which implements the PCI-IOV standard. In one embodiment, the inline PCI-IOV device can have two PCIe connections: one that connects to an IOV-aware host device or an IOV-aware PCIe switch (i.e., the front-side connection), and one that connects to the non-IOV compliant device (i.e., the back-side connection). With those connections, the inline PCI-IOV device can enable I/O virtualization for the back-side non-IOV PCI device.

Figure 1:
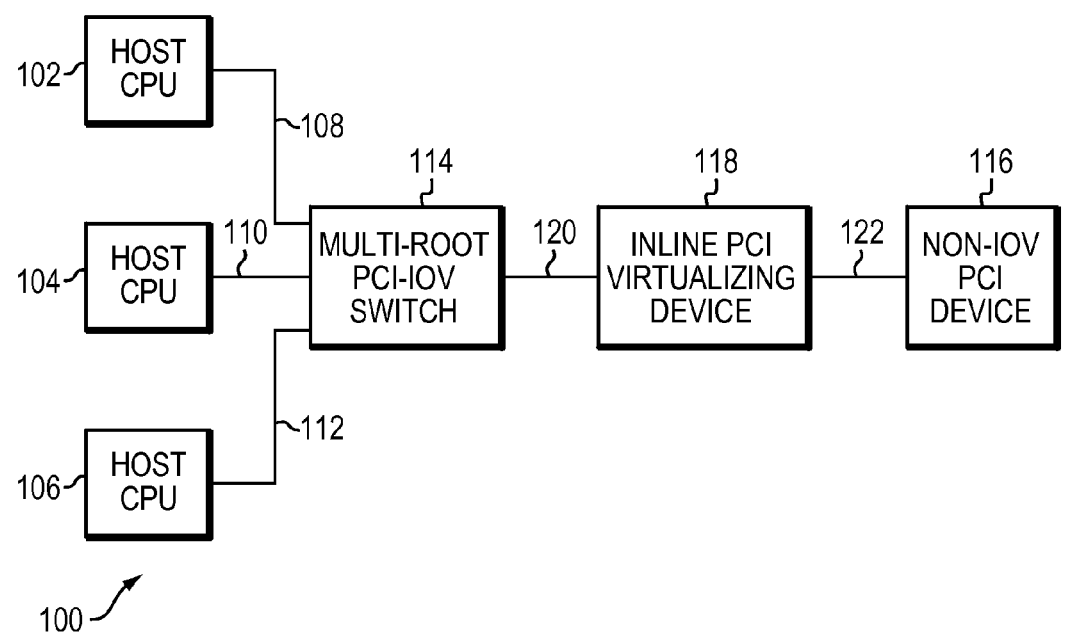
FIG. 1 is a block diagram illustrating a system including an inline PCI-IOV device according to an embodiment of the present invention.

An exemplary system including an embodiment of the inline PCI-IOV device is illustrated in FIG. 1. This illustrated system is a multi-root IOV variation of the invention. As illustrated, the system 100 includes three host CPUs 102, 104, 106. In one embodiment, the multiple host CPUs 102, 104, 106 can be a part of a single blade system where the three host CPUs 102, 104, 106 are plugged into the chassis of the blade system. Although three host CPUs 102, 104, 106 are shown in the FIG. 1, it should be understood that the system 100 may include any number of host CPUs.

Each of the host CPU units 102, 104, 106 can be connected to a multi-root PCI-IOV switch 114 via respective PCI buses 108, 110, 112. The multi-root PCI-IOV switch 114 in this embodiment is compliant with the PCI-IOV protocol. It allows the multiple host CPUs 102, 104, 106 to share access to other IOV-compliant devices (not shown in FIG. 1) connected to the multi-root PCI-IOV switch 114. The multi-root PCI-IOV switch 114 is required in the multi-root IOV embodiment of this invention.

In comparison, in a single root embodiment of the invention, there is only one host CPU, but the host CPU runs a number of independent system images. System images are well known in the art as software constructs that behave much like independent host CPUs. Each of these independent system images may be assigned a particular virtualized function (VF) provided by the device. In the single root IOV embodiment, the multi-root PCI-IOV switch shown in FIG. 1 is not needed. A single root device can be configured by enhancement to the chip sets and BIOS or other similar means well known in the art. The enhancement can be done through changes to the host CPU chipset and firmware and software or with only changes to the software.

As previously mentioned, currently, there is no available PCI-IOV standard conforming device capable of retrofitting virtualization on an existing non-virtualized adapter. A non-IOV compliant device can still be connected to multiple host CPUs 102, 104, 106. However, if the existing non-IOV device is not combined with any type of inline PCI-IOV device or adapter, the non-IOV PCI device cannot be shared by multiple host CPUs 102, 104, 106. In this embodiment of the invention, an inline PCI-IOV device is provided to facilitate I/O virtualization for the non-IOV PCI device.

Referring back to FIG. 1, an inline PCI-IOV device 118 is illustrated with its front side connected to the multi-root PCI-IOV switch 114 via a front-side bus 120 and its back side connected to the non-IOV PCI device 116 via a back-side bus 122. In a single root embodiment, the multi-root PCI-IOV switch can be connected to a single host CPU via the front-side bus. The non-IOV PCI device 116 can be any existing network device that is not compliant with the new PCI-IOV standard. For example, the non-IOV PCI device 116 can be an existing Fibre Channel (FC) adapter. In one embodiment, the inline PCI-IOV device 118 can be an ASIC (or other types of chip) inserted between the existing non-IOV PCI device 116 and the multi-root IOV PCI switch 114. In other embodiments, the inline PCI-IOV device 118 can be a standalone integrated circuit. The inline PCI-IOV device 118 is designed to translate communication between an IOV compliant PCI (e.g., the multi-root PCI-IOV switch 114) and a non-IOV PCI (e.g., the non-IOV PCI device 116) so that the IOV compliant PCI can be used in the non-IOV compliant device 116. In one embodiment, the inline PCI-IOV device 118 and the non-IOV PCI device 116 can be combined in a single larger physical component.

The inline PCI-IOV device 118 illustrated in FIG. 1 is designed to be capable of performing a number of different I/O related tasks. For example, the inline PCI-IOV device 118 can implement PCI configuration space for each of the virtualized functions presented on its front side to the multi-root PCI-IOV switch 114 and the host CPUs 102, 104, 106 connected to the multi-root PCI-IOV switch 114. PCI configuration space is the underlying way that the Conventional PCI, PCI-X and PCI Express perform automatic configuration of PCIe devices inserted into their bus. In particular, PCI configuration space is a range of addresses that can be read and written by the hosts. Their content is generally defined by the PCI standards.

The PCI configuration space implemented by the inline PCI-IOV device 118 can include not only the traditional PCI configuration space, but also newly defined capabilities for multi-root and single root I/O Virtualization. In a virtualized device, there can be a number of virtualized functions. Each virtualized function can have its own configuration space registers. Each PCI device typically can expose a number of configuration space registers. In one embodiment, a number of PCI functions can be implemented in the inline PCI-IOV device 118. These PCI functions can be accessed by the one or more of the host CPUs 102, 104, 106. Each PCI function can consist of logical registers with functionalities for implementing the registers. In the case of a configuration space register, the non-IOV PCI device 116 can only implement a single set of configuration space registers. However, in the inline PCI-IOV device 118, the single set of configuration space registers can be replicated to create multiple sets of the same configuration space registers, one for each of the virtualized functions that are present.

Additionally or alternatively, the inline PCI-IOV device 118 of FIG. 1 can also implement host accessible registers, which are accessible through PCI memory or I/O space, for each of the virtualized functions. The host accessible registers are registers that can be used to implement the functionalities of the device. For example, in a Fibre Channel adapter, a number of registers can be provided to access the Fibre Channel functionalities. Again, because the non-IOV PCI device 116 only has one set of these registers, the inline PCI-IOV device 118 is designed to create multiple sets of these registers so that each virtualized function has its own register set. The inline PCI-IOV device 118 can notify the non-IOV PCI device 116 of host register access, when necessary. Although not shown in FIG. 1, the registers can be a part of the inline PCI-IOV device 118. In one embodiment, all register and memory access by PCI can be handled by a soft register unit, which will be discussed in detail below.

Additionally or alternatively, the inline PCI-IOV device 118 can allow the non-IOV PCI device 116 on its back side to access the host accessible registers of the virtualized functions. That is, the non-IOV PCI device 116 can read from and write to the host accessible registers of the virtualized functions.

In one embodiment of the invention, a notification queue can be used to enable the inline PCI-IOV device 118 to communicate register value changes to the back-side non-IOV PCI device 116. In particular, every time the host accesses a register or writes a value of a register or one of the virtualized functions, the non-IOV device 116 on the back side needs to be notified that the value of the particular register has changed and what the new value is. A message queue can be used to communicate this information. In one embodiment, the message queues can be a sequence of memory locations that are written with a sequence of messages, each containing the identification of the register that was modified and the value it had been modified to. The memory locations can be internal embedded memory in the inline PCI-IOV device 118 and can be read by the non-IOV PCI device 116 across the back side PCI bus.

Additionally or alternatively, the inline PCI-IOV device 118 can allow the non-IOV PCI device 116 to perform read and write transactions to the host memory (not shown in FIG. 1). This can be the primary mechanism for data transfer across PCI. Because the protocol for performing such operations in I/O virtualization is different from the standard network protocols, a new mechanism is introduced to map DMAs mastered by the non-IOV PCI device 116 on the back side of the inline PCI-IOV device 118 and translate them into IOV DMAs on the front side of the PCI-IOV device 118 through address mapping.

A PCI memory transaction typically contains a 64-bit address that specifies the destination of the transaction. The address also indicates which function masters the transaction. For the non-IOV PCI device 116 on the back side of the inline PCI-IOV device 118, there is no choice of which function masters the transaction. However, on the front-side bus 120, if a number of functions are being virtualized with each transaction that gets mastered, there is a need to indicate which function is mastering a particular transaction. In one embodiment, this can be done by utilizing the high order 19 bits of the address on the back-side bus 122. As a result, the firmware running on the non-IOV PCI device 118 can indicate, in the high order seven bits of the address, the function that it chooses to master the transaction. The next twelve bits can be used to indicate an index into a mapping RAM. The contents of this RAM can include the original 19 bits of high order address. As such, the 64 bits on the back side are effectively translated into a 71-bit address on the front side. In other words, the 71 bits may consist of 64 address bits plus seven bits that indicate the function mastering the transaction.

The functions are important because, in the multi-root embodiment, the multi-root PCI-IOV switch 114 will use that information to route the read and write transactions from a DMA to the correct host when there are multiple hosts 102, 104, 106 in the system, as shown in FIG. 1. In the single root embodiment, the hardware inside the host can determine which memory actually gets accessed so that each function can obtain a different section of the host memory. For example, the PCI address and the PCI function number together can be used to determine which physical memory gets accessed.

In short, the embodiment disclosed above uses a specialized ASIC (i.e., the inline PCI-IOV device) to turn a non-IOV PCI device into an IOV compliant device. Embodiments of the invention can be implemented in a combination of hardware and firmware. In particular, an embodiment of the inline PCI-IOV device may require an ASIC design for the in-line PCI-IOV device 118 and firmware that runs in an embedded processor of the in-line PCI-IOV device 118. The non-IOV PCI device 116 can include embedded firmware and an embedded processor that runs firmware. That firmware can be modified to be IOV compliant to enable virtualization capability for the non-IOV PCI device 116, in accordance with embodiments of this invention.

As previously discussed, the inline PCI-IOV device 118 of FIG. 1 is capable of implementing host accessible registers for the virtualized functions and notifying the non-IOV PCI device 116 on the back side of such host register access. Because the inline PCI-IOV device 118 can potentially support many virtualized functions corresponding to a single physical link and each virtualized function needs to have its own register set, the number of registers, including both implementation specific registers and PCI defined configuration registers, can become very large. Conventionally, the registers are implemented in hardware, for example, as ASIC gates. However, if all registers have to be implemented in hardware, a large number of gates may be needed to support all the virtualized functions in a virtualized system. To avoid this potential increase in hardware cost, another aspect of the invention introduces a soft register implementation that uses embedded RAM to store register data.

The soft register implementation is an alternative implementation of the more traditional ways of implementing registers, which is using direct flip-flops or memory directly written inside a chip. In the soft register implementation, all register and memory access by PCI and by the functional unit to any registers or memory visible to PCI can be handled by a Soft Register Unit. The Soft Register Unit can be used to implement the storage of registers in embedded RAM rather than in ASIC gates. That is, the storage for the register data is all contained in embedded RAM. The Soft Register Unit can be a part of the inline PCI-IOV device 118 of FIG. 1 to provide a single chip solution for facilitating I/O virtualization. However, it should be understood that embodiments of the Soft Register Unit disclosed in this invention are not only limited to be used in conjunction with the above-disclosed inline PCI-IOV device, but can also be incorporated into other products that facilitate virtualization in hardware in a single device (e.g., a single-chip IOV device).

Figure 2:
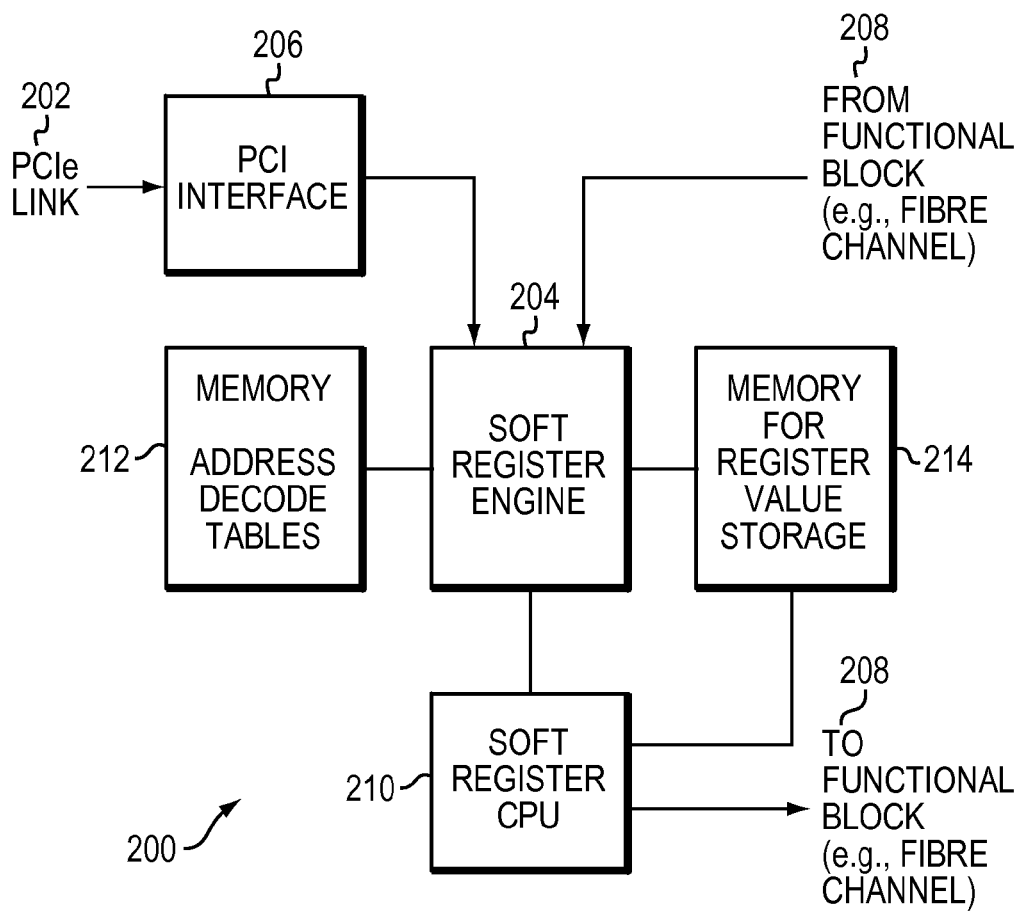
FIG. 2 is a block diagram illustrating a Soft Register Unit according to an embodiment of the present invention.

FIG. 2 is a block diagram illustrating an exemplary embodiment of the Soft Register Unit 200. As illustrated, the Soft Register Unit 200 includes a Soft Register Engine 204, which is a hardware unit. The Soft Register Engine 204 is the core piece of the Soft Register Unit 200. The Soft Register Engine 204 can handle all read and write requests as they are received by the Soft Register Unit 200. The Soft Register Engine is connected to a PCIe link 202 via a PCI interface 206. The PCI link 202 connects the Soft Register Unit 200 to one or more host CPUs (e.g., the host CPUs 102, 104, 106 of FIG. 1). The host CPUs can read and write various registers located in the soft register space via this PCIe link 202. In addition, the Soft Register Engine 202 can be connected to one or more functional blocks 208 (e.g., Fibre Channel), from which it can receive register access requests.

The Soft Register Unit 200 also includes an internal access to the registers (not shown). Internal registers may be accessed by an internal CPU or internal hardware. In the embodiment in which the Soft Register Unit 200 is embedded in an inline PCI-IOV device, the internal access can come from the non-IOV PCI device via the back-side PCI bus.

The Soft Register Unit 200 is further connected to a Soft Register CPU 210. As illustrated, the Soft Register CPU 210 can also include an output to the functional block(s) 208. The Soft Register CPU 210 runs firmware for implementing register functionality. In addition, the Soft Register CPU 210 can perform tasks such as address decoding and register value updates. However, according to embodiments of the invention, the Soft Register Engine 204 may offload those tasks typically performed by the Soft Register CPU 210 to improve overall efficiency of the system. A detailed description of how the Soft Register Unit 200 handles register access requests by the functional unit is provided below.

FIG. 2 also illustrates two memory blocks 212, 214 connected to the Soft Register Engine 204. The memory block on the left includes an address decode table 212 and the memory block on the right is a register value storage 214. The soft register CPU 210 has access to both the address decode table 212 and the register value storage 214. The address decode table 102 can also be accessed by the Soft Register Engine 204. However, in one embodiment, the memory storing the address decode tables 212 can be initialized by the Soft Register CPU 210 before it can be accessed by the Soft Register Engine 204.

Figure 3:
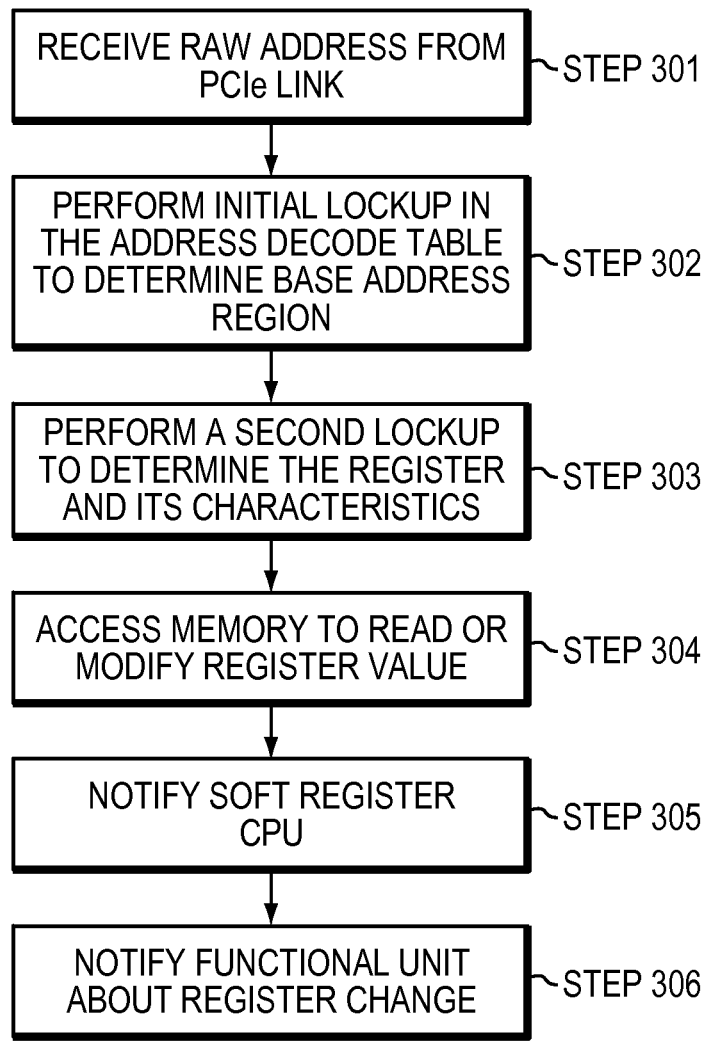
FIG. 3 is a flow chart illustrating the operation of a Soft Register Unit according to an embodiment of the present invention.

FIG. 3 illustrates the exemplary steps in a typical PCI transaction handled by the Soft Register Unit 200. In the case of a PCI transaction, first, a memory access request including a raw address is received by the Soft Register Engine 204 from the PCIe Link 202 (Step 301). PCI memory addresses are assigned by the host writing base address values to base address registers located in the PCI configuration space. As a result, when the base address register is written, the Soft Register CPU 210 can configure the address decode table 212 to decode the address range defined by that base address register. When the memory access request is received, the Soft Register Engine 204 performs an initial associative lookup in the address decode table 212 to determine which base address region that particular address falls within (step 302). In one embodiment, the specific structure used for the table search to find the base address region can be a red-black tree. Other well known search mechanisms such as other types of binary tree lookup, hash table lookup can also be used to find the correct base address range.

After the Soft Register Engine 204 determines the base address range, a second look up of similar nature is performed to determine the offset within the base address range (i.e., the specific register within the base address range) and the register characteristics of that register (step 303). The register characteristics includes, for example, the location of the value of the register in the embedded memory, instructions on whether access to this register requires involvement of the firmware running on the Soft Register CPU 210, and instructions on how writes to this register are processed (e.g., which bits are writable, which are write-one-clear, which are write-one-set, and which are read-only).

After determining the specific register and the characteristics of the register (e.g., the access mode to the register in the embedded storage), the Software Register Engine 204 can then access the register in the memory and modify its value, if the operation is a write operation, or fetch the value, if the operation is a read operation (step 304).

By having the Soft Register Engine 204 instead of the Soft Register CPU 210 performing register access, it may improve overall response time of the system because firmware running on the Soft Register CPU 210 is much slower than the Soft Register Engine 204, which is fully implemented in hardware. However, in some cases, it may be beneficial or even necessary for the Soft Register Engine 204 to allow the firmware on the Soft Register CPU 210 to handle at least part of the register access and/or other related task. That is, depending on the requirement of the system and the type of transaction that is requested, the Soft Register Engine 204 may involve the Soft Register CPU 210 in the processing of register access requests. For example, the next step illustrated in FIG. 3 is an optional step of notifying the Soft Register CPU 210 about the change of the register value in the memory so that the Soft Register CPU 210 can take further actions, if necessary (step 305).

In addition, when a particular register changes its value, the Soft Register Unit 200 can also notify the functional unit 208 which handles the functional protocol (step 306). The notification can be done by means of a message which is queued into a message queue for register value change messages. The use of a message queue to notify the function unit (e.g., in Fibre Channel) 208 of register value changes is more efficient and more fair than traditional priority interrupt schemes for firmware determining value changes of hard registers. In a traditional non-IOV Fibre Channel, there are typically very few registers. However, a notification scheme using message queues, as disclosed in the embodiments of this invention can provide better scalability for a virtualized system with a large number of registers.

Referring back to steps 304 and 305 of FIG. 3, various methods may be used to determine whether the Soft Register CPU 210 needs to be involved in a register access and the extent of its involvement. Preferably, the Soft Register Engine 204 handles most speed-critical tasks because, as mentioned above, the hardware-based Soft Register Engine 204 is faster than the Soft Register CPU 210. Tasks that are not speed-critical tasks can be handled by the Soft Register CPU 210, especially if the Soft Register Engine is running close to its capacity. There are yet other tasks, such as error handling, that are preferably handled by the Soft Register CPU 210 rather than by the Soft Register Engine. The following paragraphs describe in more detail how the Soft Register Engine 210 and the Soft Register CPU 210 can cooperatively handle register access.

In one embodiment, all access are handled by the Soft Register Engine 204, from the initial decoding of the raw address to the actual reading or writing of the register value contained in memory. This embodiment is suited for registers which get accessed frequently during the normal processing of data. No assistance is needed from firmware running on the Soft Register CPU 210. In fact, the Soft Register CPU 210 is not even notified about the register access. Because sending notification may be expensive in terms of computing time, the overall performance of the system can be improved by having the Soft Register Engine 204 handle the register access on its own without notifying the Soft Register CPU 210.

In another embodiment, the Soft Register Engine 204 handles the register access, but the firmware in the Soft Register Unit 200 is notified that the value of the register has changed so that any additional requirements can be handled by the Soft Register CPU 204. This can provide additional advantage in a virtualized system. In a conventional system, a CPU may poll a few of the registers to determine if any action needs to be taken. However, this type of polling does not scale well with virtualization. In a virtualized system, there may be thousands of register for the CPU to poll. It can be time consuming for the CPU to determine which register has been updated. In that case, by having the hardware (e.g., the Soft Register Engine 204) presenting to the CPU (e.g., the Soft Register CPU 210) a list of changes that has happened, the CPU can avoid polling a large number of registers.

The Soft Register Engine 204 can use different methods to notify the Soft Register CPU 210 about the change. In one embodiment, each register is associated with a notification state machine which can indicate to the Soft Register Engine 204 whether or not the Soft Register Engine 204 should notify the firmware on the Soft Register CPU 210 about a particular value change that has occurred. The state is stored in the RAM and updated after each register access. Preferably, the Soft Register CPU 210 is notified only when the CPU is required to take certain action in response to the change.

In yet another embodiment, the Soft Register Engine 204 decodes the raw address from the request, but the Soft Register CPU 210 handles the register access and any subsequent and related requirements. This can be done for some of the registers where the access is a bit more complex and the performance requirement is relatively low.

In yet another embodiment, the Soft Register Engine 204 hands off the access to the firmware running on the Soft Register CPU 210. The access is fully processed by the Soft Register CPU 210. This embodiment may be suited for a number of situations. For example, all configuration space access can be handled by the Soft Register CPU 210 rather than by the Soft Register Engine 204 because configuration space access is typically not speed-critical and does not need to be performed in an accelerated fashion.

In addition, the Soft Register CPU 210, instead of the Soft Register Engine 204, can be responsible for handling any error cases. In particular, if any type of error occurs during any steps of a register access, e.g., if the address decode table does not include any entry corresponding to an address, the Soft Register Engine 204 can be programmed to automatically notify and hand off the process to the Soft Register CPU 210 so that the Soft Register CPU 210 can take over and carry about the necessary exception/error handling routine.

As discussed above, speed-critical tasks are preferably handled by the Soft Register Engine 204. However, even some of the speed-critical tasks can be passed to the Soft Register CPU 210, if necessary. For example, a register value change verification can be performed the Soft Register CPU 210.

Whether or not to hand off at least part to register access process to the Soft Register CPU 201 can be determined by the type of PCI transaction requested. For example, when a transaction dealing with PCI configuration cycle is received, the Soft Register Engine 204 recognizes that the access is to be handled by the firmware in the Soft Register CPU 210. Accordingly, the Soft Register Engine 204 hands off the request to the Soft Register CPU 210. Additionally or alternatively, the decision of whether to involve the Soft Register CPU 210 in the processing of an access can be based on configuration data stored in the address decode table 212. If the data in that table indicates that the particular access needs be handled by the Soft Register CPU 210, the firmware in the Soft Register CPU 210 will be notified. In contrast, if the data in the address decode table 212 indicates that the Soft Register Engine 204 can handle the access without requesting assistance from the Soft Register CPU 210, no notification will be sent to the Soft Register Engine and the access will be processed by the Soft Register Engine. In one embodiment, for each register, there can be a related register which holds information that allows the Soft Register Engine 204 to determine if a specific access should cause a notification of the Soft Register CPU 210. The related register's location can be an output of the address table decode process. The related register is typically located in embedded RAM. The Soft Register Engine can follow the direction as given in that related register and proceed accordingly.

The soft register implementation discussed above provides a number of advantages over the conventional hardware implementation. First, the soft register implementation offers more flexibility than the conventional hardware implementation. For example, it allows the functionality of standards defined registers to be modified via firmware changes. This provides a relatively simple way to fix errors in the implementation and to adapt changes in the standard, especially one as complex and as immature as the PCI-IOV standards. This flexible implementation can also be used to allow conformity with future standards.

Second, a fairly large number of registers can be implemented without needing to expand a huge amount of hardware. Because the Soft Register Unit allows the storage for a large number of registers to be implemented in an embedded RAM rather than gates, there is a less demand for power and silicon area on a chip. Because the soft register implementation uses memory instead of gates to implement registers, the number of registers that can be implemented using the disclosed soft register implementation mainly depends on how much physical memory is available. In fact, the only substantial scalability limit of the soft register implementation is the amount of memory that can be embedded in a chip. In particular, memory is required to hold the values of the registers and acts as a backing store for them. In addition, some control memory may also be needed to indicate the characteristics of these registers, such as how they behave and when they are written. Even more memory space may be needed to implement additional registers which indicate where each register is located in the address space. Nevertheless, implementing registers in embedded memory can still provide a significant advantage over registers implemented with gates.

In addition, because the soft register implementation improves the scalability of the virtualized system so that the system can include a larger number of virtualized functions, less physical resources are needed, which, in turn, can reduce the power consumption of the ASICs and the overall system.

Using the soft register implementation also makes it possible to implement new PCIe features on a device that has already been committed to silicon. Conventionally, all PCI features require capability structure which indicates that the features are present and have registers that control their actions. Often the functionality of new features is implemented in firmware. However, because the registers are always committed to hardware, it is impossible to implement any new features in the register aspect. The soft register implementation offers the flexibility to implement these registers without adding hardware as new PCI features are added. That is, it allows new features to be added without making any hardware changes because they can all be implemented using the soft register implementation. This way, there is no need to redesign the ASIC to have new capabilities. The only changes are those to the firmware.

Although Fibre Channel is mentioned as an exemplary network environment for implementing embodiments of this invention, it should be understood that embodiments of this invention can work with any type of I/O device that uses a PCI bus.

Figure 4:
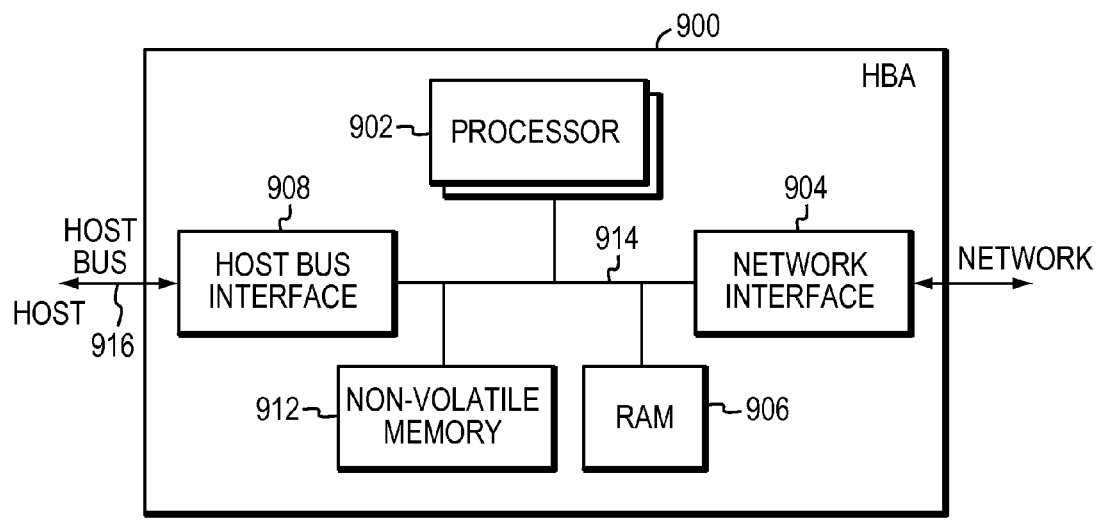
FIG. 4 illustrates an HBA, which may include an embodiment of the invention.

FIG. 4 illustrates an HBA which can include embodiments. As illustrated, the HBA 900 includes one or more processors 902, a network interface 904, a host bus interface 908, and computer readable storage media, such as Random Access Memory (RAM) 906 and non-volatile memory 912. The various components of the HBA 900 are all connected to a bus 914 in the HBA 900 and adapted to communicate with each other using the bus 914. The RAM 912 and the non-volatile memory 906 may be used to store firmware of the HBA 900 and other data. In other embodiments, the firmware may be stored on an external computer-readable storage medium such as a disk and loaded into the HBA 900 during operation. The host bus interface 908 connects the HBA 700 to its host via a host bus 910. The network interface 904 provides a gateway to an external network.

Figure 5:
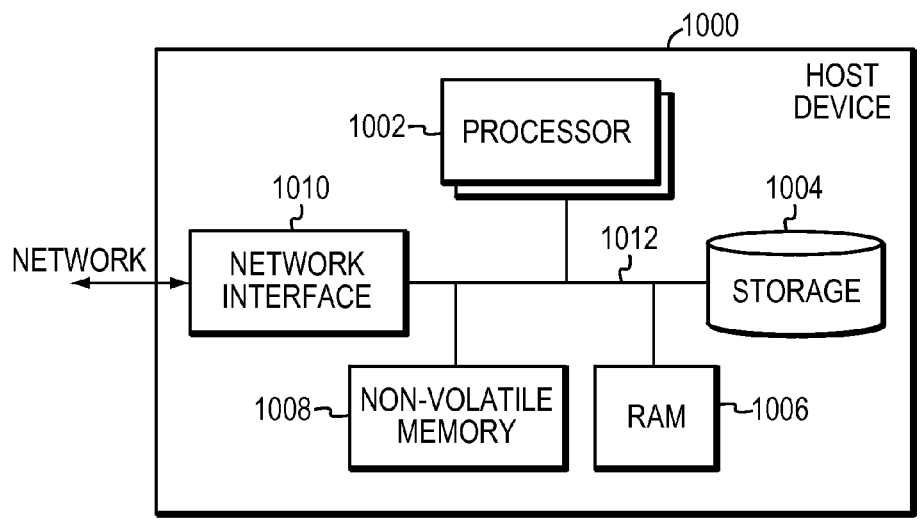
FIG. 5 illustrates an exemplary server, which may include an embodiment of the invention.

FIG. 5 illustrates an exemplary server which can include embodiments of the invention. The host device 1000 includes one or more processors 1002, a storage device 1004, a network interface 1010, RAM 1006, and non-volatile memory 1008. The host device 1000 may also include one or more device drivers and one or more HBAs (not shown) as described above in view of FIG. 4. The processor 1002 may execute instructions stored in computer-readable storage media such as the RAM 1006 and the non-volatile memory 1008. The storage device 1004 may be a disk capable of storing programs such as firmware for the HBA. The host device is adapted to transmit and receive data from the network using the network interface 1010.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims.

The invention claimed is:
1. An apparatus comprising:
an inline PCI virtualizing device configured for connecting to a multi-root switch via a front-side bus and a physical back-side device via a back-side bus; and
a Soft Register Unit for facilitating register access, wherein register data is stored in an embedded RAM of the Soft Register Unit,
wherein the inline PCI virtualizing device and the physical back-side device are different devices,
wherein the multi-root switch is configured for connecting to each of a plurality of host CPUs via respective buses,
wherein the inline PCI virtualizing device is configured for retrofitting input/output (I/O) virtualization on the physical back-side device for sharing the physical back-side device by the plurality of host CPUs, and
wherein the inline PCI virtualizing device comprises one or more virtualized functions.

2. The apparatus of claim 1, wherein the inline PCI virtualizing device is an ASIC.

3. The apparatus of claim 1, wherein the inline PCI virtualizing device is integrated with the physical back-side device.

4. The apparatus of claim 1, wherein the physical back-side device is a PCI device and the buses are PCI buses.

5. The apparatus of claim 1, wherein the inline PCI virtualizing device facilitates address mapping to allow the physical back-side device to master DMA transactions that are mapped to the one or more virtualized functions.

6. The apparatus of claim 1, wherein the inline PCI virtualizing device uses a notification queue to communicate register value changes to the physical back-side device.

7. The apparatus of claim 6, wherein the notification queue is a sequence of memory locations that are written in with a sequence of messages, each containing an identification of a register and the value of the register.

8. The apparatus of claim 1, wherein the plurality of host CPUs are on a single physical computing device.

9. The apparatus of claim 8, wherein the single physical computing device is a blade system.

10. The apparatus of claim 1, wherein the physical back-side device is a non-IOV device.

11. The apparatus of claim 10, wherein the physical back-side non-IOV device is a Fibre Channel Host Bus Adapter.

12. The apparatus of claim 1, wherein the inline PCI virtualizing device implements PCI configuration space for the physical back-side device.

13. The apparatus of claim 1, wherein firmware on the physical back-side device indicates, in the high order bits of an address associated with a transaction, a physical function chosen to master the transaction.

14. An apparatus comprising:
an inline PCI virtualizing device configured for connecting to a host CPU via a front-side bus and a physical back-side device via a back-side bus; and
a Soft Register Unit for facilitating register access, wherein register data is stored in an embedded RAM of the Soft Register Unit,
wherein the inline PCI virtualizing device and the physical back-side device are different devices,
wherein the host CPU is configured for running a plurality of system images, each of the system images assigned a particular virtualized function (VF),
wherein the inline PCI virtualizing device is configured for retrofitting input/output (I/O) virtualization on the physical back-side device for sharing the physical back-side device by the plurality of system images, and
wherein the inline PCI virtualizing device comprises one or more virtualized functions.

15. The apparatus of claim 14, wherein the inline PCI virtualizing device is an ASIC.

16. The apparatus of claim 14, wherein the inline PCI virtualizing device is integrated with the physical back-side device.

17. The apparatus of claim 14, wherein the physical back-side device is a PCI device and the buses are PCI buses.

18. The apparatus of claim 14, wherein the inline PCI virtualizing device facilitates address mapping to allow the physical back-side device to master DMA transactions that are mapped to the one or more virtualized functions.

19. The apparatus of claim 14, wherein the inline PCI virtualizing device uses a notification queue to communicate register value changes to the physical back-side device.

20. The apparatus of claim 19, wherein the notification queue is a sequence of memory locations that are written in with a sequence of messages, each containing an identification of a register and the value of the register.

21. The apparatus of claim 14, wherein the physical back-side device is a non-IOV device.

22. The apparatus of claim 21, wherein the physical back-side non-IOV device is a Fibre Channel Host Bus Adapter.

23. The apparatus of claim 14, wherein the inline PCI virtualizing device implements PCI configuration space for the physical back-side device.

24. The apparatus of claim 14, wherein firmware on the physical back-side device indicates, in the high order bits of an address associated with a transaction, a physical function chosen to master the transaction.

25. The apparatus of claim 1, wherein the inline PCI virtualizing device includes a plurality of sets of registers, each of the sets of registers accessible by a corresponding host CPU of the plurality of host CPUs and implementing functionalities of the physical back-side device.

26. The apparatus of claim 14, wherein the inline PCI virtualizing device includes a plurality of sets of registers, each of the sets of registers accessible by a corresponding system image of the plurality of system images and implementing functionalities of the physical back-side device.

27. A method comprising:
connecting an inline PCI virtualizing device to a multi-root switch, wherein the multi-root switch is configured for connecting to each of a plurality of host CPUs via respective buses;
connecting the inline PCI virtualizing device to a physical device, wherein the inline PCI virtualizing device and the physical device are different devices;
retrofitting, via the inline PCI virtualizing device, input/output (I/O) virtualization on the physical device for sharing the physical device by the plurality of host CPUs;
generating one or more virtualized functions within the inline PCI virtualizing device; and
storing register data in an embedded RAM of a Soft Register Unit for facilitating register access.

28. The method of claim 27, further comprising:
facilitating, via the inline PCI virtualizing device, address mapping to allow the physical device to master DMA transactions that are mapped to the one or more virtualized functions.

29. The method of claim 27, further comprising:
using, via the inline PCI virtualizing device, a notification queue to communicate register value changes to the physical device.

30. The method of claim 27, further comprising:
implementing, via the inline PCI virtualizing device, PCI configuration space for the physical device.

31. A method comprising:
connecting an inline PCI virtualizing device to a host CPU;
generating one or more virtualized functions within the inline PCI virtualizing device, wherein the host CPU is configured for running a plurality of system images, each of the system images assigned a particular virtualized function (VF) of the one or more virtualized functions;
connecting the inline PCI virtualizing device to a physical device, wherein the inline PCI virtualizing device and the physical device are different devices;
retrofitting, via the inline PCI virtualizing device, input/output (I/O) virtualization on the physical device for sharing the physical device by the plurality of system images; and
storing register data in an embedded RAM of a Soft Register Unit for facilitating register access.

32. The method of claim 31, further comprising:
facilitating, via the inline PCI virtualizing device, address mapping to allow the physical device to master DMA transactions that are mapped to the one or more virtualized functions.

33. The method of claim 31, further comprising:
using, via the inline PCI virtualizing device, a notification queue to communicate register value changes to the physical device.

34. The method of claim 31, further comprising:
implementing, via the inline PCI virtualizing device, PCI configuration space for the physical device.

* * * * *